United States Patent [19]

Portier

[11] Patent Number: 5,021,088

[45] Date of Patent: Jun. 4, 1991

[54] BIOHYDROMETALLURGICAL PROCESSING OF ORES, AND MICROORGANISMS THEREFOR

[75] Inventor: Ralph J. Portier, Baton Rouge, La.

[73] Assignee: Louisiana State University, Baton Rouge, La.

[21] Appl. No.: 527,135

[22] Filed: May 22, 1990

Related U.S. Application Data

[63] Continuation-in-part of Ser. No. 265,950, Nov. 2, 1988, abandoned.

[51] Int. Cl.$^5$ .............................................. C22B 3/18
[52] U.S. Cl. ............................. 75/736; 423/DIG. 17; 423/27
[58] Field of Search ................... 423/DIG. 17, 26, 27, 423/28, 29, 31, 32, 33, 34, 43; 75/721, 744, 747, 420

[56] References Cited

U.S. PATENT DOCUMENTS

| | | | |
|---|---|---|---|
| 2,829,964 | 4/1958 | Zimmerley et al. | 423/DIG. 17 |
| 3,272,621 | 9/1966 | Zajic | 423/DIG. 17 |
| 3,796,308 | 3/1974 | McIlhinney et al. | 423/DIG. 17 |
| 4,293,333 | 10/1981 | Drobot | 423/DIG. 7 |
| 4,293,334 | 10/1981 | Drobot et al. | 423/DIG. 17 |
| 4,497,778 | 2/1985 | Pooley | 423/DIG. 17 |
| 4,571,387 | 2/1986 | Brunynestyn et al. | 423/27 |
| 4,728,082 | 3/1988 | Emmett, Jr. et al. | 423/DIG. 17 |
| 4,729,788 | 3/1988 | Hutchins et al. | 423/27 |
| 4,732,608 | 3/1988 | Emmett, Jr. et al. | 423/DIG. 17 |
| 4,740,243 | 4/1988 | Krebs-Yuill et al. | 423/DIG. 17 |
| 4,752,332 | 6/1988 | Wu et al. | 423/DiG. 17 |
| 4,758,417 | 7/1984 | Van Lookern Campagne | 423/DIG. 17 |
| 4,822,413 | 4/1989 | Pooley et al. | 423/DIG. 17 |

FOREIGN PATENT DOCUMENTS

2180829  4/1987  United Kingdom ....... 423/DIG. 17

OTHER PUBLICATIONS

Chemical Engineering McGraw Hill, Sep. 30, 1985, pp. 19–25.

*Primary Examiner*—Theodore Morris
*Assistant Examiner*—Edward Sguillante
*Attorney, Agent, or Firm*—Llewellyn A. Proctor

[57] ABSTRACT

A process for the separation and recovery from an ore of a metal, or metals, particularly strategic and precious metals, notably gold. A carbon-containing, gold-bearing ore, notably a carbonaceous or carbonaceous pyritic ore, is contacted and microbially pretreated and leached with a heterotrophic microorganism, or admixture of microogansims, at heterotrophic conditions to cultivate and grow and said microorganism, or microorganisms, and reduce the carbon content of the ore by consumption of the carbon. The ore, as a result of the heterotrophic pretreatment is subsequently more advantageously colonized by an autotrophic microorganism, or microorganisms, at autotrophic conditions, or hydrometallurgically treated, or both, to facilitate, enhance and increase the amount of gold recovered vis-a-vis a process wherein the gold is recovered (1) by hydrometallurgical processing alone at otherwise similar conditions, or (2), in treating a pyritic ore, by the combination of the autotrophic/hydrometallurgical processing, at otherwise similar conditions.

20 Claims, No Drawings

BIOHYDROMETALLURGICAL PROCESSING OF ORES, AND MICROORGANISMS THEREFOR

RELATED APPLICATIONS

This is a continuation-in-part of application Ser. No. 265,950, filed Nov. 2, 1988 by Ralph J. Portier, now abandoned.

FIELD OF THE INVENTION

This invention relates to a process for the recovery of gold from gold-containing ores, and novel microorganisms for this purpose. In particular, it relates to a process for the recovery of gold from a refractory ore, especially a microbially assisted process for the recovery of gold from gold-containing refractory ores, particularly carbonaceous and carbonaceous pyritic ores, and novel microorganisms for this purpose.

DEFINITIONS

For the most part the terms employed to define the various ores will be clearly understood by those knowledgeable in this art. Three metallurgical terms commonly used to define gold ores however may be deserving of specific mention, and are herein used, to wit:

A refractory gold ore is an ore that is not amenable to conventional cyanidation treatment. Such ores are often refractory because of their excessive content of metallic sulfides (e.g., pyrite) or organic carbonaceous matter.

Pyrite ores refer to refractory ores whose refractory nature is caused by their relatively high content of pyrite ($FeS_2$). The pyrite tends to occlude finely disseminated gold contained in the ores.

Carbonaceous ores refer to refractory ores which contain carbonaceous impurities capable of adsorbing a gold-cyanide complex.

The term carbonaceous is generally applied to those ores containing graphitic carbon which causes gold to adsorb on the carbon, thus causing premature precipitation during cyanidation. The gold passes out of the plant with the tailings. The carbonaceous materials which create this problem are graphitic carbon and long chain organic compounds similar to humic acids. The carbon appears to adsorb the gold cyanide complex [$Au(CN)_2^-$] from cyanide leaching solutions and the long-chain organic compounds appear to form stable complexes with the gold. These ores are not amenable to standard cyanidation techniques because the carbonaceous impurities with which they are associated tend to tie up the cyanide gold complexes in chemical compounds from which the gold cannot be separated by standard methods. Accordingly, in the context of this disclosure, reference to a gold-containing or gold-bearing ore as "carbon-containing", "bituminous carbon-containing" or "carbonaceous" means that the ore contains carbonaceous matter which exhibits the property of inhibiting or substantially reducing the extraction of gold from such ores by conventional cyanidation technology. Ores of this type as described in U.S. Pat. No. 3,639,925 which issued Feb. 8, 1972 to Bernard J. Scheiner et al, generally have an average total carbon content ranging from about 2 to 5 weight percent, with selected portions of the ore containing as much as 12 weight percent carbon. The organic carbon content of the ore is usually between about 0.25 and 0.8 percent by weight, the organic carbon having properties similar to humic acid. Essentially all of the inorganic carbon is in the form of carbonates. Characteristically these ores, as suggested, are not amenable to standard cyanidation techniques, i.e., less than 50% gold extraction is obtainable from them when treated by conventional straight cyanidation techniques. Ores of this type are found intermingled with oxide ores throughout the world, and are particularly prevalent wherever the gold deposit is the result of hydrothermal deposition of carbonaceous strata. Such ores, often set aside because of the difficulty of treating them by the conventional cyanide process, are also described in U.S. Pat. No. 4,188,208 which issued Feb. 12, 1980 to Wilbur J. Guay, and U.S. Pat. No. 4,289,532 which issued Sept. 15, 1981 to Raphael F. Matson et al.

BACKGROUND AND PROBLEMS

Early gold mining was confined to rich out-crops from which gold was recovered by simple wash techniques. With the discovery of pyritic ores, just before the turn of the century, it became necessary to separate yet smaller amounts of gold from even larger amounts of ore. In extracting the gold, typically the ore was contacted with mercury to recover a part of the gold, and gold not removed by mercury extraction was recovered in a cyanidation process. As the rich deposits became depleted, it became necessary to process leaner deposits. Moreover, it became necessary to process refractory gold ores, i.e., ores which are not amenable to conventional cyanidation treatment, often because of their excessive content of metallic sulfides (e.g., pyrite) or organic carbonaceous matter, or both. The pyrite tends to occlude finely disseminated gold contained in the ores, and organic carbonaceous impurities are capable of adsorbing a gold-cyanide cyanide complex. New leaching techniques have been developed, but nonetheless it is rather difficult to extract gold in the quantities desirable from untreated carbonaceous and carbonaceous pyritic ores. Recoveries were poor, and valuable resources were wasted.

Biohydrometallurgical processes were developed, but this type of processing too is not without its problems. A fine grind of the ore was required for satisfactory treatment, and it was necessary to use low solids slurries. Moreover, long treatment times were required.

In a cyanidation process, which remains in use today, a crushed, particulate ore is contacted and sold dissolved by a dilute solution of an alkali or alkaline-earth metal cyanide, e.g., calcium cyanide or sodium cyanide, to produce a gold cyanide complex. A finely divided zinc powder is then added to the gold containing cyanide solution, the zinc replacing the gold in the cyanide solution. The gold is precipitated as a black powder which is separated from the solution by filtration. The powder is mixed with fluxes, and then smelted. The impurities form a slag, leaving the gold behind as crude bullion from which, with further refining, pure gold is recovered.

Analysis of acidic waste water from various mines, e.g., copper mines, led to the discovery some years ago that the presence of soluble iron, copper and sulfuric acid was not due to a purely chemical process, but instead to a microbiological process in which autotrophic bacteria oxidized the iron, i.e., *Thiobacillus ferrooxidans*, and sulphur, i.e., *Thiobacillus thiooxidans*, to leach iron and copper from sulfide ores. The *Thiobacillus ferrooxidans* can obtain carbon for biosynthesis solely from $CO_2$ fixation, and energy from the oxidation of $Fe^{2+}$ to $Fe^{3+}$ or from the oxidation of either elemental sulfur or reduced sulfur compounds. The oxidation of insoluble sulfur to sulfuric acid can also be performed by *Thiobacillus thiooxidans*. These organisms are often found in admixture on the examination of leaching dumps and both have been used in improved microbial leaching processes for the recovery of metals from ores. Moreover, since the development of these processes, other microbial leaching processes have been developed, and processes based on microbial leaching may include the older more conventional chemical treatment steps.

Vast quantities of ores are available throughout the world, inclusive of low grade ores and waste heaps produced as by-products during the mining and milling of high grade ores, and many of these ores and waste heaps contain strategic and precious metals, particularly gold. Gold is usually present only in minute concentration in any ore, e.g., pyritic ores, this in itself making its recovery difficult by conventional processes, e.g., cyanide treatment. It does not appear possible to recover all of the gold from any ore, often not even enough to make its recovery from an ore economically justifiable. Moreover, much gold can remain in an ore after treatment even though sufficient gold is recovered to make the process economically viable. This represents the waste of a valuable asset.

The necessity of reducing an ore to small particle size for biohydrometallurgical treatment is in itself burdensome. Many gold recovery processes in use today generally cannot efficiently process an ore without having to reduce the particle size to about 200 to 400 mesh Tyler. Moreover, in slurrying the ore for biohydrometallurgical processing, the ore solids content of the slurry generally cannot exceed about 10 percent, base on the weight of the slurry, for efficient processing. Further, the time required to efficiently process the ore generally exceeds size or seven days, and the amount of gold which can be recovered from the ore even over this period is less than desirable. Consequently, there is a need for more effective methods which would permit more efficient recovery of the gold at larger particle size, higher ore loadings in a given reactor space, reduced operating cycles, and higher gold recoveries. There is also a need for methods which can more efficiently process the more recalcitrant ores, particularly pyritic and carbonaceous ores.

OBJECTS

It is, accordingly, the primary object of this invention to supply these needs, and others.

It is, in particular, an object of the present invention to provide a novel, and improved process for the microbial treatment and recovery from ores of metals, particularly strategic and precious metals, and more particularly gold, as well as provide novel microorganisms useful for this purpose.

It is, more particularly, an object of this invention to provide a novel microbial treatment process, and novel microorganisms therefor, wherein the extractability of the various metals contained within an ore, e.g., iron, copper, zinc, and the like, particularly strategic and precious metals, most particularly gold, is facilitated, improved, or enhanced.

A further and more specific object is to provide a novel microbial process for enhancing the extractability of various metals contained within an ore, e.g., iron, copper, zinc and the like, particularly strategic and precious metals, most particularly gold, via the use of a heterotrophic microorganisms, or admixture of heterotrophic microorganisms, at heterotrophic conditions; particularly a process wherein the treatment with a heterotrophic microorganism, or heterotrophic microorganisms, involves subsequent treatment of the ore at different conditions with a different microorganism, or microorganisms.

A yet further object is to provide for enhancing or facilitating the recovery of gold from a bituminous carbon-containing, gold-bearing, sulfur-containing ore, particularly a carbonaceous pyrite or pyrite-containing ore, a process combination for a staged microbial treatment of the ore, first with one type of microorganism, preferably a heterotrophic microorganism, at one set of conditions to reduce the bituminous carbon content of the ore, and subsequently with a second type of microorganism at different conditions to oxidize the sulfur component of the ore.

A further, and yet more specific object is to provide a staged heterotrophic/autotrophic combination process for the treatment of ores, particularly a staged heterotrophic/autotrophic process for the recovery of gold from bituminous carbon-containing, gold-bearing, sulfur-containing ore, particularly a whole ore via techniques which do not require fine grinding of the ore, while permitting high solids slurries and relatively short treatment periods.

THE INVENTION

These object and others can be achieved in accordance with the present invention which embodies a process for treating a carbonaceous, or carbon-containing, particulate ore for facilitating the recovery of metals, particularly a carbon-containing, gold-bearing ore for facilitating the recovery of gold, which comprises treating, or pre-treating said ore by contact therewith of a liquid medium, preferably an aqueous medium, which contains a heterotrophic microorganism, or admixture of heterotrophic microorganisms, at heterotrophic conditions, to cultivate and grow said microorganism, or microorganisms, and reduce the carbon content of the ore by consumption of the carbon; and novel heterotrophic microorganisms for said purpose.

The preferred process is one embodying treating a particulate bituminous carbon-containing, gold-bearing pyrite ($FeS_2$) ore in a series of steps which include (1) admixing said ore in a first step with a liquid medium, preferably an aqueous medium, which contains a heterotrophic microorganism and nutrients to form a slurry, and continuing the treatment of said slurry at conditions sufficient to cultivate the heterotrophic microorganism and reduce the bituminous carbon content of the ore by consumption of the bituminous carbon (which is converted by the heterotrophic microorganisms to carbon dioxide), with a liquid medium, preferably an aqueous medium, which contains an autotrophic microorganism and nutrient, at conditions sufficient to oxidize the iron and sulfur components of the pyrite ore. In fact, it has been found that up to 85 percent of the gold, based on the total weight of gold present in the raw ore, can be recovered from a carbonaceous pyritic ore by the process of this invention as contrasted with about 5 percent gold recovery via conventional cyanide treatment of the untreated ore.

Cultures constituting novel, and preferred strains of heterotrophic microorganisms for conducting step (1), supra, of the process, have been isolated, modified, purified and found effective in treating carbonaceous and carbonaceous pyritic ores to enhance gold recovery therefrom, and have been deposited with the American Type Culture Collection, 12301 Parklawn Drive, Rockville, Md. 20852. The microorganisms have been given the following identifying ATCC numbers, to wit:

| Strain Designation | ATCC Number |
| --- | --- |
| Fungal | |
| Aspergillus brunneio-uniseriatus | ATCC SD 1076 |
| Penicillium citrinum | ATCC SD 1077 |
| Bacterial | |
| Alcaligenes denitrificans | ATCC SD 1079 |
| Pseudomonas cepacia | ATCC SD 1080 |
| Citrobacter freundii | ATCC SD 1081 |
| Pseudomonas cepacia | ATCC SD 1082 |

These microorganisms, on patenting, will be maintained on deposit for a period of thirty years, for five years after the last request for the microorganism, or for the enforceable life of the patent, whichever is longer. Should a deposit become non-viable it will be replaced. Assurance of access to the deposit as determined by the commissioner under 37 CFR 1.14 is provided for. All restrictions on the availability of a deposit to the public will be irrevocably removed upon the granting of a patent.

Preferred strains of autotrophic microorganisms for conducting the step, or steps described in (2), supra, of the process include:

| | ATCC |
| --- | --- |
| Thiobacillis ferrooxidans | |
| Thiobacillis thiooxidans | |
| Thiobacillis strain TB/101-E/LSU | |
| Thiobacillis F TB 101-F/LSU | SD 1083 |
| Thiobacillis E 301-E/LSU | |
| Thiobacillis F TB 302-E/LSU | SD 1084 |

These organisms, which feed on the iron and sulfur contained in the pyrite, are known and described in the literature. Of these the *Thiobacillus ferrooxidans* and *Thiobacillus thiooxidans* are more preferred, particularly the former because it utilizes both iron and sulfur as growth factors.

Two of the cultures submitted to ATCC for identification were given code numbers SD 1083 and SD 1084, as designated. These Thiobacillus isolates could not be characterized at the ATCC because the ATCC has no profile by which an evaluation can be performed. However, the *Thiobacillus ferrooxidans* is the only autotrophic Thiobacillus to oxidize ferrous compounds, and can be identified as *T. ferrooxidans*.

The bituminous carbon, or organic carbon, content of the ore was perceived and has been identified as a barrier to higher extractions of gold from a carbonaceous or carbon-containing ore. Albeit *Thiobacillis ferrooxidans* has heretofore been recognized as playing a significant role in solubilizing many metals from their ores, the ultimate efficacy of such microbial treatments can be adversely affected by refractory forms of carbon. Pretreatment of the ore with the heterotrophic microbial strains attacks the entrenched bituminous carbon and converts the carbon to carbon dioxide, as consequence of which further hydrometallurgical or biohydrometallurgical processing of the ore is facilitated, and gold recovery enhanced. The action of the heterotrophs on the ore, e.g., apparently minimizes interactions between the organic carbon, and optimizes the available sulphur for utilization by the autotrophic microbial strains in the subsequent bioleaching stage, or stages. The ore, as a result of the heterotrophic pretreatment is thus more advantageously colonized by the autotrophic microbial strains, this enhancing the degree of sulphur destruction by the autotrophs. The heterotrophic treatment thus facilitates and enhances the work of the autotrophs, and thus contributes to the iron and sulphur chemistry modifications of the autotrophs to recover gold. As a consequence, greater amounts of gold can be recovered from a carbonaceous pyritic ore by the heterotrophic pretreatment, or heterotrophic and autotrophic pretreatments than can be realized, at otherwise similar conditions, by (1) treatment per se of the ore by e.g., conventional cyanidation, or (2) autotroph treatment of the ore followed by treatment of the autotroph-pretreated ore via one of the more conventional hydrometallurgical methods of extraction, e.g., cyanidation. Additionally, those ores characterized as predominantly carbonaceous can be effectively pretreated using the heterotrophic method described followed by conventional methods of extraction, e.g., chlorination or cyanidation.

the heterotrophic treatment of the bituminous carbon-containing gold-bearing pyritic ore can be carried out in one, or in a plurality of stages; but generally a single stage is adequate. An ore which has been crushed, and ground to a Tyler mesh size as large as 100 mesh is added with water to a tank, or container and admixed therewith to form an aqueous slurry. The ore solids component of the slurry generally ranges from about 5 percent to about 45 percent, but preferably ranges above about 10 percent, more preferably from about about 20 percent, to about 30 percent, based on the total weight of the slurry. The pH of the slurry is adjusted if required, by the addition of an alkaline solution to bring the pH within a range of from about 7.0 to about 8.7, preferably from about 7.5 to about 8.2. The microbial component is then added, as also is a nutrient broth to provide nourishment for the heterotrophic microorganism, or admixture of heterotrophic microorganisms. The temperature of the slurry is maintained at from about 21° C. to about 35° C., preferably about 28° C. to about 30° C., and the heterotrophic treatment is conducted over a period of time ranging from about 15 hours to about 42 hours, preferably from about 20 hours to about 30 hours. At these conditions it has been found that the bituminous carbon associated with the pyritic ore is attacked by the heterotrophic microorganism, or admixture of heterotrophic microorganisms, and reduced by conversion to carbon dioxide which is evolved from the system. As a consequence greater amount of gold are recovered in the subsequent treatment via a conventional gold recovery process, e.g., cyanide extraction, from a given or at otherwise similar conditions of treatment than can be recovered by (a) cyanide treatment of the untreated ore, or (b) microbial treatment of the ore at autotrophic conditions without microbial treatment of the ore at heterotrophic conditions, with subsequent cyanidation. Whereas the reason for this is not entirely understood, it is a clearly established fact that treatment of the ore with the heterotrophic microorganism, or microorganisms, biotransforms and utilizes the bituminous carbon associated with an ore, notably a carbonaceous or carbonaceous pyritic ore, or ore containing both bituminous carbon and sulfur, and in doing so results in greater recoveries of the gold than otherwise possible during the post biological processing of the ore using, e.g., cyanidation as conventionally practiced. Another advantage of the heterotrophic treatment is that an ore of larger mesh, or larger grind size, can be efficiently treated; more so than can be treated by a process which does not include the heterotrophic treatment. Moreover, shorter retention periods of treatment are required, and the loading rate [or percent ore solids in a given volume of liquid (g/l) which can be treated] is greater than in a process which does not include the heterotrophic treatment.

In conducting the autotrophic treatment of the ore, the slurry from the heterotrophic pretreatment stage, or stages, must be modified to support an autotrophic strain of microorganism, or admixture of such microorganisms; or the ore solids portion of the slurry must be separated from its liquid and added to another portion of liquid, and this portion of liquid modified to support cultures of the autotrophic strain of microorganism since the conditions required for the autotrophic treatment differ from those required for the heterotrophic treatment of the previously treated ore. The ore slurry, or separated ore previously treated at heterotrophic conditions is then treated at autotrophic conditions. The ore is treated in one, and preferably in a series of stages, generally in from about 2 to about 12 stages, preferably from about 3 to about 7 stages, to oxidize the sulfur and iron components of the ore.

The autotrophic reaction is suitably, and preferably carried out in continuous or semi-continuous stirred tank reactors. Suitably, the slurry from the heterotrophic treatment vessel, or vessels, is charged into a hold-up tank and acid added to lower the pH. The ore solids content of the slurry, like that employed in the heterotrophic treatment, ranges from about 5 percent to about 45 percent, preferably from about 20 percent to about 30 percent, based on the total weight of the slurry. Suitably, the pH of the liquid, preferably water, is brought within and maintained between about 2.2 and about 3.2, preferably between about 2.5 and 2.7. After the acid treatment, the slurry is discharged from the hold-up tank into the reactor, or first of a series of reactors to be used for the autotrophic treatment of the ore. Whereas the pH is initially reached by adding acid to the slurry, and acid can be added from time to time if required to maintain the acid pH, this is generally not required in conducting the autotrophic operation. Generally sufficient acid is generated by biooxidation of the sulfur to maintain the desired pH. After adjustment of the pH, the temperature is adjusted to and maintained at from about 21° C. to about 35° C., preferably from about 30° C. to about 31° C., if required, and then the autotrophic microorganism, or microorganisms, is added along with a nutrient broth to sustain the growth of the microbial component, or components. The total residence, or total hold-up time of the ore slurry within the several stages generally ranges from about 72 hours to about 144 hours, preferably from about 120 hours to about 130 hours. In the autotrophic reaction the sulfur and iron components of the ore are oxidized and solubilized. The ore surface are pitted, thereby exposing more gold to subsequent cyanidation; thus improving gold recovery.

The invention, and its principle of operation, will be more fully understood by reference to the following examples presenting data illustrating its more salient features. For example, the data show enhanced gold recoveries by the use of heterotrophic carbon-utilizing microorganisms for pretreatment of a carbonaceous or carbonaceous pyritic ore; and even greater recoveries of gold from such ores when using a combination of heterotrophic/autotrophic pretreatments. The gold can be recovered at these high values even when slurries of the ore are treated at high solids contents, at relatively coarse grind size, and at low temperatures. All parts are given in terms of weight except as otherwise expressed.

The example immediately following describes batch studies wherein a carbonaceous pyritic ore was treated, first with a heterotrophic microorganism, and then with both heterotrophic and autotrophic microorganisms. Sterile controls were run with each experiment, or test. Gold was then extracted from the treated ores and the controls, and these data are given for purposes of comparison.

EXAMPLE 1

A portion of a Big Springs, Nev., carbonaceous pyritic ore was pretreated in stirred batch mode in a first test with a heterotrophic microorganism [(H); *Aspergillus brunneio-uniseriatus* ATCC SD 1076] and other portions of the ore in two additional test runs via the combination of an initial pretreatment of the ore with the heterotrophic microorganism and subsequent pretreatment with an autotrophic microorganism [(A); *Thiobacillis* F TB 101-F/LSU ATCC SD 1083] over a specified period of days. Minimal acid treatments to lower pH was employed after treatment with the heterotrophic microorganism. Both the heterotrophic and autotrophic treatments were conducted at 32° C. in 15 percent and 25 percent slurries of −100 mesh Tyler ore (7.1 ppm Au, 1.54% S, and 0.30% organic carbon) in water, respectively. These tests were conducted with controls at similar conditions, but without treatment with a microorganism. As a final step gold was extracted from both the treated ores and the sterile controls by the known carbon-in-leach (CIL) cyanidation method.

CIL (carbon-in-leach) cyanidation is a frequently used method for extracting gold from ores in full scale operations, CIL cyanidation also serves as a method for determining the percentage of gold that has been extracted from ores being processed. Ore slurry is mixed with cyanide and activated carbon for a period of time. Gold is leached from the ore and adsorbed onto the activated carbon. Standard analytic techniques can then be used to determine the percentage of gold extracted. The CIL cyanidation method was employed to determine the values reported by these data.

Table 1 presents data on these stirred single reactor tests.

TABLE 1

| Test | % Solids | Treatment (Days) | Final pH | % Au Extraction |
|---|---|---|---|---|
| 1 Control | 25 | | 8.4 | 35 |
| 1 Experiment | 25 | 4H | 5.1 | 58 |
| 2 Control | 15 | | 8.4 | 35 |
| 2 Experiment | 15 | 2H/2A | 2.1 | 65 |
| 3 Control | 25 | | 7.3 | 35 |
| 3 Experiment | 25 | 3H/7A | 1.9 | 82 |

It is quite evident from these data that treatment of the ore with the heterotroph over a four day period greatly enhances the recovery of gold from the ore, i.e., by about 65.7%. In contrast, treatment over the same total period by treatment with both the heterotroph and autotroph shows clear synergism; providing even greater recovery of the gold, i.e., about 85.7%. Treatment with the heterotroph over a three day period followed by treatment with the autotroph over a seven day period, on the other hand, provides 134% recovery of the gold. It is also significant that the % solids loaded into the reactor is not a critical factor as relates to the amount of gold recovery. Increases in % solids well above 10% for carbonaceous pyritic ores have resulted in favorable performance.

The contribution of heterotrophic pretreatment and combined heterotrophic/autotrophic pretreatments is also particularly apparent when sulfur oxidation values are evaluated by similar treatments of the same −100 mesh grind carbonaceous pyritic ore. Reference is made to Table 2, "% Sulfur" being expressed as % sulfur oxidized and "% Au Extraction" as the % gold extracted via the CIL cyanidation method.

TABLE 2

| Test | % Solids | Treatment (Days) | % Sulphur | % Au Extraction |
| --- | --- | --- | --- | --- |
| 4 Control | 15 | | 0 | 35 |
| 4 Experiment | 15 | 4H/4A | 67 | 62 |
| 5 Control | 25 | | 0 | 35 |
| 5 Experiment | 25 | 3H | 31 | 45 |
| 5 Experiment | 25 | 3H/7A | 75 | 82 |

These data show quite clearly that the heterotrophic pretreatment significantly improved sulfur oxidation values with only three days treatment. Subsequent autotrophic pretreatment, in sequence, showed marked improvement in % sulphur oxidation (Table 2, Test 5). An improvement in sulfur oxidation correlates positively with improvements in Au extraction (Table 2, Tests 4 and 5). The % solids is significantly high, with the high loading rate for combined heterotroph/autotroph pretreatment generating higher % CIL values.

The following example illustrates the heterotroph biohydrometallurgical treatment in a stirred batch reactor of carbonaceous ore.

Example 2

Portions of Jerritt Canyon carbonaceous ore (13.2 ppm Au, 1.1% S and 0.50% C) ground to −100 mesh were tested in a lock cycle mode wherein a stirred reactor was used for a heterotrophic pretreatment step at 32° C., followed by conventional chlorination. Side-by-side sterile controls were also run for purposes of comparison. The results are given in Table 3.

TABLE 3

| Test | % Solids | Treatment (Days) | Final pH | % Au Extraction |
| --- | --- | --- | --- | --- |
| 1 Control | 10/15/20 | | 7.9 | 48 |
| 1 Experiment | 10 | 25H | 6.7 | 71 |
| 1 Experiment | 15 | 25H | 6.7 | 61 |
| 1 Experiment | 20 | 4H | 6.5 | 58 |
| 2 Control | 25 | | 8.1 | 48 |
| 2 Experiment | 25 | 13H | 5.6 | 68 |

These data show that gold extraction values were also enhanced as a result of the heterotroph pretreatment step. With increased % solids concentrations (20–25%), notable increases in Au extraction were realized with less treatment time (Table 3, Test 1 with 20% solids; Test 2, 25% solids). This translates into a cost savings for conventional chlorination of these ores. For examples, 30 lbs/ton bleach would be used in the test described in Table 3, Test 2 as compared to 50 lbs/ton bleach for the controls to realize a 79% value for Au extraction.

A pilot plant unit was employed in conducting the runs described by the following examples. A unit was constituted of a series of reactors, or vessels, including a lead heterotroph cell, or mixing reactor, a series of continuously stirred autotroph cells, aerated tanks, or reactors, and a liquid/solid separator tank within which the microbially treated solid ore particles from the last autotroph reactor of the series was separated for gold extraction via the known carbon-in-leach (CIL) cyanidation method. A pH or acid adjustment tank was employed for the addition of acid to the several autotroph reactors.

EXAMPLE 3

A Big Springs, Nev., carbonaceous pyritic ore was treated in a unit employing, as a lead reactor, a heterotrophic reactor, followed by a series of four continuous stirred autotrophic reactors. The ore analyzed as follows, to wit:
7.1 ppm Au
1.54% total S
0.2% sulfate
0.39% organic C
100 mesh (Tyler)

The conditions imposed on the several reactors of the unit are described as follows:

Heterotroph Reactor

30% solids; Incubation Temperature
30° C.; pH=7.2; and
Ore Retention Time was 24 hours.

The *Aspergillus brunneio-uniseriatus* species was employed.

Autotroph Reactors (4;A1 through A4)
In Each: Ore Retention time 18 hours
In Each: Thiobacillis Sp 101-E/LSU.
pH: #A1 pH=2.2; #A2 pH−2.0; #A3 pH=1.8 #A4 pH>1.8

Operation of this unit continuously, at these conditions, over a period of 16 days resulted in 73% CIL cyanidation gold extraction. The % CIL cyanidation gold extraction reactor profile for the unit is given as follows:

| Reactor(s) | % Au Extraction (Mean Values) |
| --- | --- |
| Heterotroph | 35 |
| Autotroph | |
| A1 | 44 |
| A2 | 55 |
| A3 | 66 |
| A4 | 73 |

High biomass performance in the heterotroph pretreatment of the ore, it will be observed, resulted in noteworthy CIL values prior to autotroph treatment, and the CIL gold extractions values improved with the autotroph treatments. The relationships between pH and CIL gold extraction was found to be fairly linear, lower pH values in autotroph treatment tending to indicate not only high biomass performance but improvement in CIL gold extraction values. CIL gold extraction values for heterotroph treatment varied, and was found to vary between 30 and 50% for a corresponding pH level from from 6.2 to 7.4.

EXAMPLE 4

In a subsequent operation, a similar unit was employed except that seven autotroph reactors were employed to treat a Big Springs carbonaceous pyritic ore, having a higher % total sulfur and lower % organic carbon. The ore that was treated is characterized as follows:

7.2 ppm Au
2.0% total sulfur
0.23% sulfate
0.21% organic carbon
90% at 100 mesh

The operating parameters for each of the several reactors are described as follows:

Heterotroph Reactor

30% solids; Incubation temperature 30° C.; pH=8.1 *Citrobacter freundii* sp. (ATCC SD 1081) Ore Retention Time=24 hours

| Autotroph Reactors (7:A1 through A7) | Ore Retention Time, Hrs. | pH (Mean Values) |
|---|---|---|
| A1 | 18 | 2.5 |
| A2 | 18 | 2.4 |
| A3 | 18 | 2.2 |
| A4 | 18 | 2.0 |
| A5 | 18 | ≦1.8 |
| A6 | 18 | ≦1.8 |
| A7 | 18 | ≦1.8 |

In each: *Thiobacillis* sp TB101-F/LSU (ATCC SD 1083).

Operation of this unit continuously, at these conditions, over a period of 3.3 days resulted in 75% CIL gold extractions. The % CIL gold extraction profile for the unit is given as follows:

| Reactor(s) | % Au Extraction |
|---|---|
| Heterotroph | 35 |
| Autotroph | |
| A1 | 35 |
| A2 | 65 |
| A3 | 71 |
| A4 | 72 |
| A5 | 72 |
| A6 | 76 |
| A7 | 82 |

These data show a maximum 82% CIL extraction of gold from the Big Springs carbonaceous pyritic, or sulfidic ore after 6 days of treatment. Additional biotreatment up to 13 days retention has been shown to increase the % CIL gold extraction to 85%.

EXAMPLE 5

The continuous run described in Example 4 was repeated, the test in this instance having been conducted in a "modified continuous" or sequencing batch mode. Thus, a portion of the contents of each reactor was moved forward daily, to simulate movement obtained through pumping. This in effect increased the retention of the ore in the system to six days. This subsequent test confirmed the 82% CIL extraction described in Example 4.

In conducting this run the heterotroph reactor contained 25 percent ore solids, the slurry was maintained at pH=7.5, and the ore retention time was 24 hours. The seven autotroph reactors were fed with the 25 percent ore solids slurry, and the pH adjusted to 2.5. A gradient pH within the range of 2.5 and 1.8 was maintained between the first autotroph reactor (A1) and the last autotroph reactor (A7), with a total retention time of 148 hours.

The additional residence time of the ore in the autotroph reactors coupled with the ore's batch movement resulted in a marked increase (approximately 10%) in the CIL gold extraction profile of the system.

Reference is made to Table 4. Herein are given for Reactors A1, A3, A5 and A7 comparisons between the % CIL gold (Au) extraction rate for the continuous mode of operation described in Example 4 (and verified) for a 6 day retention period, and the modified continuous or sequencing batch mode of operation for retention periods of 6 days, 9 days, 11 days and 13 days, respectively. It is clear that the additional biotreatment (up to 13 days retention) did in fact increase the gold extraction to 85%.

TABLE 4

| | | % CIL Au Extraction | | | |
|---|---|---|---|---|---|
| | Retention Time | Reactors | | | |
| Mode | Days | A1 | A3 | A5 | A7 |
| Continuous (Example 2) | 6 | 35 | 71 | 72 | 82 |
| Batch Movement (Example 3) | 9 | 44 | 75 | 69 | 75 |
| | 11 | 46 | 75 | 71 | 83 |
| | 13 | 57 | 78 | 78 | 85 |

Microorganisms, either the heterotrophs or autotrophs, may be used in this process either as pure cultures, or as mixed cultures of the selected microorganisms to provide improved results in either step, or steps, of the biohydrometallurgical process. The heterotrophs and autotrophs each perform different tasks in the process: the heterotrophs consuming carbon and metabolically converting the carbon to carbon dioxide; the autotrophs solubilizing iron and sulfur. The heterotrophs lower ore slurry pH and provide carbon dioxide as a source of carbon for the autotrophs. Dual treatments with these types of organisms, in particular, enhance the subsequent hydrometallurigcal treatment for the recovery of metals, notably gold, from various refractory ores—e.g., gold ores not amenable to conventional treatment because of their content of metallic sulfides (e.g., pyrite) and/or organic carbonaceous matter. The heterotrophs were obtained and isolated from Big Springs, Nev., and Jerritt Canyon ores via screening a large number of microorganisms to select the most promising candidate for use in ore pretreatment, based on gold extractions. The heterotrophs can be cultured in a growth medium containing sufficient nutrients to provide the required quantities of nitrogen, phosphates, trace elements, etc. for growth. A growth medium for fungal strains of heterotrophs is, e.g., potassium phosphate (dibasic) 1.0 g/l, $MgSO_4$ 0.5 g/l, and peptone 1.5 g/l.474.

Table 5 lists the Morphological, Cultural and Physiological Properties of the heterotropic microorganisms of this invention.

TABLE 5

| Strain Designation | ATCC Number |
|---|---|
| Fungal | |
| *Aspergillus brunneio-uniseriatus*[1] | SD 1076 |

TABLE 5-continued

| Strain Designation | ATCC Number |
|---|---|
| A fungal isolate from a Big Springs, Nevada ore; budding filamentous: Morphological description: Conidiophore with loosely radiate condial heads. Vesicles clavate to subglobose. Sterigmata in one series. Conidia globose 6 to 8 microns, strongly spinulose, becoming warty in age with distinct connections often persisting on the coidia after detachment. Penicillium citrinum[2] | SD 1077 |
| A fungal isolate from a Big Springs, Nevada ore. Morphological description: Conidiophore smooth-walled with divergent whorls of metulae without further branching. Condida globose, smooth-walled, not exceeding 3 microns in diameter. Biochemical and Physiological Results: Produces bright yellow pigmentation diffusing into the agar medium. | |

[1]Note: This isolate was compared to reference culture, ATCC 16916.
[2]Note: This isolate was compared to reference culture, ATCC 9849.

The *Thiobacillis ferroxidans* microorganism employed in conducting these examples was obtained from mineral soils which contained oil spilled on drilling sites, drill cuttings, sulfidic and carbonaceous ores from several sites in the locality of Big Springs, Nev. Small quantities of oil, ore and soil and water samples from these sites were inoculated on supportive growth media and incubated at 30° C. and 32° C.

A supplemental growth medium for *Thiobacillis* strains can be employed to provide minimal nutritional requirements and to adjust the pH of the ore surfaces for epiphytic attachment. A mixing of Solution A and B provides an inoculation and/or leachate solution at pH 2.6–2.7, to wit: Solution A: ammonium sulfate, 0.8 g; potassium phosphate (monobasic), 0.4 g: water, IL. Solution B: $FeSO_4 7H_2O$, 10 g; sulfuric acid (reagent grade), 0.1 ml; water, 100 ml.

Bacterial
*Alcaligenes denitrificans*
Subsp. xylosoxidans.

Synonyms for this name are *Achromobacter xylosoxidans* and *Alcaligenes xylosoxidans*
subsp. xylosoxidans.

Comments on taxonomy of genus: The classification of the species in the genus Alcaligenes and the genus Achromobacter in the past was based primarily on biochemical and physiological properties, many of which were negative. More recent studies have included carbon source utilization, DNA base composition, r-RNA-DNA homology, and gel electropherotic protein patterns in addition to conventional phenotypic characteristics. This has brought about the clustering of strains into different groups resulting in confusing name changes.

*Bergey's Manual of Systematic Bacteriology*, 1984, and the *Approved Lists of Bacterial Names* recognize the following:
*Alcaligenes Faecalis*
A denitrificans subsp. denitrificans
A. denitrificans subsp. xylosoxidans Lenette, in the *Manual of Clinical Microbiology*, 1085, Tilton in *The Prokaryotes*, 1981m, and Clark in *Identification of Unusual Pathogenic Gram-Negative aerobic and Facultatively Aanerobic Bacteria*, 1984, retain the older classification and recognize the following species:
*Alcaligenes faecalis*
A. *odorans*
A. *denitrificans*
Archromobacter xylosoxidans Kiredjian et al., 1986, propose to change the name of *Alcaligenes denitrificans* subsp. xylosoxidans to *Alcaligenes xylosoxidans* subsp. xylosoxidans.

The ATCC at the present time is following the classification of Bergey's Manual. According to this, SD 1079 has been name *Alcaligenes denitrificans* subsp. xylosoxidans.

Features of SD 1079

Morphology: This strain is a moltile, Gram negative rod. The flagella are peritrichous in 24 hour broth cultures. Colonies are smooth and entire on nutrient agar and trypticase soy agar. On glucose agar colonies are glistening and mucoid. Pigments are not produced and poly-B-hydroxybutyrate inclusions are not formed.

Biochemical and Physiological Properties:

The strain is oxidase and catalase positive. Metabolism is respiratory. Acid is produced promptly from O-F carbohydrates. The strain denitrifies. No growth occurs at 4° C. and 41° C. Simmons citrate is positive, but gelatin and urease are negative.

Nutritional Properties: The nutritional spectrum of this strain is narrow. Of the carbohydrates and sugar derivatives tested, only D-glucose, D-xylose and D-gluconate are utilized. Of the amino acids only D-alanine and L-proline are utilized.

Organic amines and other nitrogenous compounds are not utilized.

| Characteristics of *A. denitrificans* subsp. xylosoxidans: | SD 1079 | *A. denitrificans* subsp. xylosoxidans |
|---|---|---|
| Gram negative, straight rods | + | 100* |
| Motile | + | 98 |
| Peritrichous | + | 98 |
| Oxidase | + | 100 |
| O—F glucose, acid | − | 95 W |
| O—F maltose, acid | − | 0 |
| O—F xylose, acid | + | 100 |
| Simmons citrate | + | 100 |
| Nitrate reduced to nitrite | + | 100 |
| Nitrite reduce to $N_2$ gas | + | 64 |
| Urease and gelatinase | − | 0 |
| Lysine decarboxylase | − | 0 |
| L-arginine decarboxylase | − | 0 |
| 3-Ketolactose | − | 0 |

| | SD 1079 | Bergey's Manual |
|---|---|---|
| Physiology and Biochemistry: | | |
| Gram positive | − | − |
| Gram negative | + | + |
| Gram variable | − | − |
| Motile at RT | + | + |
| *Flagella peritrichous* | + | + |
| *Flagella lophotrichous* | − | − |
| *Flagella monotrichous* | − | − |
| *Flagella lateral* | − | − |
| 4 C growth | − | |
| 25 C growth | + | |
| 30 C growth | + | |
| 37 C growth | + | |
| 41 C growth | − | |
| Fluorescein produced | − | |
| Pyocyanine produced | − | |
| Diffusible orange | − | |
| Diffusible yellow | − | |
| Diffusible purple | − | |
| Non-diffusible green | − | |
| Other non-diff. pigments | − | |

-continued

| | | |
|---|---|---|
| Melanin pigment produced | − | |
| pH 6.0 growth | + | |
| 3% NaCl growth | + | |
| 6.5% NaCl growth | + | |
| MacConkey agar growth | + | |
| Skim milk agar growth | + | |
| Aesculin hydrolysis | − | − |
| Casein hydrolysis | − | |
| Starch hydrolysis | − | − |
| Gelatinase | − | − |
| Tween 20 hydrolysis | − | |
| Tween 80 hydrolysis | − | − |
| Indole | − | |
| Simmons citrate growth | + | |
| Urease | − | − |
| Nitrate to nitrite | + | + |
| Nitrite reduction | + | + |
| Nitrite to nitrogen gas | + | + |
| Hydrogen sulfide (TSI)* | − | |
| Lead acetate strip | + | |
| Lysine decarboxylase | − | |
| Arginine (Moellers) | − | |
| Ornithine decarboxylase | − | |
| Phenylalanine deamination | − | |
| Lecithinase | − | |
| Phosphatase | + | |
| Catalase | + | + |
| Oxidase | + | + |
| Gluconate oxidation | + | |
| Growth on malonate as SCS | + | |
| Tyrosine degradation | + | |
| dl-hydroxybutyrate growth | + | + |
| PHB accumulation | − | |
| Growth on 0.05% cetrimide | − | |
| Growth on acetate as SCS | + | + |
| Testosterone deg. | − | − |
| 3-ketolactose from lactose | − | |
| Mucoid Growth on Glucose Agar | + | |

Hugh and Leifson O—F Medium:

Acid from:

| | |
|---|---|
| L-Arabinose | W |
| cellobiose | K |
| ethanol | K |
| D-fructose | K |
| D-glucose AO2 | K |
| D-glucose AnO2 | − |
| Alkaline pH in D-Glucose | + |

Acid from:

| | |
|---|---|
| glycerol | K |
| i-inositol | K |
| lactose | K |
| maltose | K |
| D-mannitol | K |
| D-mannose | W |
| L-rhamnose | W |
| D-ribose | + |
| sucrose | K |
| trehalose | K |
| D-xylose | + |
| Control | K |

Sole Carbon Source in Stanier's Basal Medium:

| | | |
|---|---|---|
| L-arabinose | − | − |
| cellobiose | − | − |
| D-fructose | − | d |
| D-glucose | W | + |
| lactose | − | − |
| maltose | − | − |
| D-mannitol | − | − |
| L-rhamnose | − | − |
| D-ribose | − | − |
| D-sorbitol | − | − |
| sucrose | − | − |
| trehalose | − | − |
| D-xylose | + | + |
| adonitol | − | − |
| erythritol | − | − |
| glycerol | − | d |
| ethanol | − | |
| i-inositol | − | − |
| sebacic acid | + | + |
| acetamide | − | − |
| adipate | + | + |
| benzoate | − | d |
| butyrate | W | + |
| citraconate | + | + |
| D-gluconate | + | + |
| M-hydroxybenzoate | − | − |
| 2-ketogluconate | − | − |
| DL-lactate | + | + |
| L-malate | + | + |
| pelargonate | W | d |
| propionate | + | + |
| quinate | − | |
| succinate | + | + |
| L-+-tartrate | − | − |
| valerate | W | + |
| B-alanine | − | d |
| D-A-alanine | + | + |
| betaine | − | − |
| glycine | − | d |
| L-histidine | − | + |
| DL-norleucine | − | d |
| L-proline | + | + |
| D-tryptophan | − | − |
| L-valine | − | + |
| DL-arginine | − | − |
| benzylamine | − | − |
| butylamine | − | − |
| putrescine | − | − |
| mesaconate | + | + |
| DL-glycerate | W | d |
| L-tryptophan | − | d |

| | ATCC Number |
|---|---|
| *Pseudomonas cepacia* | SD 1080 and SD 1082 |

* = % of strains positive (55 strains) Yabuuchi and Ohyama
W — weakly positive
K = alkaline
d = 11–89% of strains are positive

FEATURES OF ISOLATES SD 1080 AND SD 1082

Morphology: These strains are motile, gram negative rods. The flagella are polar lophotrichous. Poly-B-hydroxybutyrate is accumulated as carbon reserve material. Pigments are not formed, SD 1080 formed 2 colony types on nutrient agar: 50% are smooth, entire, pulvinate and dark; 50% are rough, flat and translucent. SD 1082 formed smooth, entire and translucent colonies on nutrient agar.

Biochemical and Nutritional Properties:

The two colony types of SD 1080 were isolated and characterized separately. All test results were identical. These strains are oxidase and catalase positive. Dentrification does not take place. The strains are lipopytic, degrade tyrosine, hydrolyze casein and decarboxylate lysine. They produce acid from all O—F substrates tested except L-rhamnose. Nutritionally they are very versatile and can utilize as sole source of carbon and energy about 75% of the compounds, tested, including carbohydrates, di-carboxylic acids, fatty acid, aromatic compounds, amino acids and amines.

| | P. cepacia* | SD 1080 | SD 1082 |
|---|---|---|---|
| Features Characteristics of *P. cepacia*: | | | |
| Actively motile rod | + | + | + |
| PHB inclusions | + | + | + |
| Respiratory metabolism | + | + | + |
| Catalase, oxidase | + | + | + |
| Polar lophotrichous flagella | + | + | + |
| Denitrification | − | − | − |
| Moeller's Arginine | − | − | − |

-continued

|  | P. cepacia* | SD 1080 | SD 1082 |
|---|---|---|---|
| Lysine decarboxylase | + | + | + |
| Nitrate reduced to nitrite | d | + | − |
| Lipolytic | + | + | + |
| Gelatin hydrolysis | d | − | + |
| Lecithinase | d | + | + |
| Growth at 4° C. | − | − | − |
| Growth at 41° C. | d | + | − |
| Versatile Nutritional Spectrum | + | + | + |
| Utilization as sole carbon source: | | | |
| Cellobiose | + | + | + |
| Sebacate | + | + | + |
| Erithritol | − | − | − |
| Glycine | − | − | − |
| Mesaconate | − | − | − |
| Differences between Isolates: | | | |
| Growth at 41° C. | d | + | − |
| 3% NaCl Growth | d | − | + |
| MacConkey Agar Growth | 95%+ | − | + |
| Aesculin Hydrolysis | d | − | + |
| Gelatin | d | − | + |
| Nitrate Reduction | d | + | − |
| Ornithine decarboxylase | d | − | + |
| Gluconate Oxidation | d | − | + |
| Growth on 0.05% cetrimide | d | − | + |
| Utilization as sole carbon sources: | | | |
| Maltose | d | − | + |
| D-xylose | d | + | − |
| Ethanol | d | − | + |
| Acetamide | d | − | + |
| Benzoate | 95%+ | + | − |
| M-hydroxybenzoate | + | − | + |
| Tryptophan | − | − | + |
| L-valine | d | − | + |
| Butylamine | 95%+ | − | + | d = 11–89% of strains are positive
*Data from BERGEY, STANIER, BALLARD, CDC, or HOLMES.
Comments: Isolates SD 1080 and SD 1082 are not identical to each other and vary in a number of respects. Most of these variations can be found to occur among typical P. cepacia strains.

Although *P. cepacia* is often though of as a yellow pigmented pseudomonas, various studies have shown that only 8–80% of the strains produce a yellow pigment. Hugh & Leifson found that pigment production by *P. Cepacia* is influenced by composition of the medium and incubation temperatures. Strains SD 1080 and SD 1082 did not form pigments.

The colonial variation exhibited by SD 1080 is a common feature of *P. cepacia* and pseudomonads in general.

Synonyms for *Pseudomonas cepacia* are Group EO-1, *P. multivorans*, and *P. kingii*.

Comparison of Isolates with Type Strain:

|  | Type Strain ATCC 25416 | SD 1080 | SD 1082 |
|---|---|---|---|
| Gram positive | − | − | − |
| Gram negative | + | + | + |
| Gram variable | − | − | − |
| Motile at RT | + | + | + |
| Flagella peritrichous | − | − | − |
| Flagella lophotrichous | + | + | + |
| Flagella monotrichous | − | − | − |
| Flagella lateral | − | − | − |
| 4° C. growth | − | − | − |
| 25° growth | + | + | + |
| 30° C. growth | + | + | + |
| 37° C. growth | + | + | + |
| 41° C. growth | +* | + | − |
| Fluorescein produced | − | − | − |
| Pyocyanine produced | − | − | − |
| Diffusible orange | − | − | − |
| Diffusible yellow | − | − | − |
| Diffusible purple | − | − | − |
| Non-diffusible green | − | − | − |
| Other non-diff. pigments | − | − | − |
| Melanin pigment produced | − | − | − |
| pH 6.0 growth | + | + | + |
| 3% NaCl growth | −* | − | + |
| 6.5% NaCl growth | − | − | − |
| MacConkey agar growth | +* | − | + |
| Skim milk agar growth | + | + | + |
| Aesculin hydrolysis | +* | − | + |
| Casein hydrolysis | + | + | + |
| Starch hydrolysis | − | − | − |
| Gelatinase | +* | − | + |
| Tween 20 hydrolysis | + | + | + |
| Tween 80 hydrolysis | + | + | + |
| Indole | − | − | − |
| Simmons citrate growth | + | + | + |
| Urease | + | + | + |
| Nitrate to nitrite | −* | + | − |
| Nitrite reduction | − | − | − |
| Nitrite to nitrogen gas | − | − | − |
| Hydrogen sulfide (TSI) | − | − | − |
| Lysine decarboxylase | + | + | + |
| Arginine (Moellers) | − | − | − |
| Ornithine decarboxylase | −* | − | + |
| Phenylalanine deamination | +* | − | − |
| Lecithinase | + | + | + |
| Phosphatase | + | + | + |
| Catalase | + | + | + |
| Oxidase | + | + | + |
| Gluconate oxidation | +* | − | + |
| Growth on malonate as SCS | + | + | + |
| Tyrosine degradation | + | + | + |
| dl-hydroxybutyrate growth | + | + | + |
| PHB accumulation | + | + | + |
| Growth on 0.05% cetrimide | −* | − | + |
| Growth on acetate as SCS | + | + | + |
| Testosterone deg. | + | + | + |
| 3 ketolactose from lactose | − | − | − |
| O—F Medium of Hugh & Leifson: | | | |
| Acid from: | | | |
| L-arabinose | + | + | + |
| cellobiose | + | + | + |
| ethanol | + | + | + |
| D-fructose | + | + | + |
| D-glucose AO2 | + | + | + |
| D-glucose AnO2 | − | − | − |
| Alkaline pH in D-Glucose | − | − | − |
| Acid from: | | | |
| glycerol | + | + | + |
| i-inositol | + | + | + |
| lactose | + | + | + |
| maltose | + | + | + |
| D-mannitol | + | + | + |
| D-mannose | + | + | + |
| L-rhamnose | K | K | K |
| D-ribose | + | + | + |
| sucrose | + | + | + |
| trehalose | + | + | + |
| D-xylose | + | + | + |
| Control | + | + | + |
| Sole Carbon Sources in Stainer's Basal Medium: | | | |
| L-arabinose | + | + | + |
| cellobiose | + | + | + |
| D-fructose | + | + | + |
| D-glucose | + | + | + |
| lactose | − | − | − |
| maltose | −d | − | + |
| D-mannitol | + | + | + |
| L-rhamnose | − | − | − |
| D-ribose | + | + | + |
| D-sorbitol | + | + | + |
| sucrose | −** | + | + |
| trehalose | + | + | + |
| D-xylose | +d | + | − |
| adonitol | + | + | + |
| erythritol | − | − | − |
| glycerol | + | + | + |
| ethanol | −d | + | + |
| i-inositol | + | + | + |

-continued

| | | | |
|---|---|---|---|
| sebacic acid | + | + | + |
| acetamide | +d | – | + |
| adipate | + | + | + |
| benzoate | +* | + | – |
| butyrate | + | + | + |
| citraconate | +d | – | – |
| D-gluconate | + | + | + |
| M-hydroxybenzoate | + | – | + |
| 2-ketogluconate | + | + | + |
| DL-lactate | + | + | + |
| L-malate | + | + | + |
| pelargonate | + | + | + |
| propionate | + | + | + |
| quinate | + | + | + |
| succinate | + | + | + |
| L-+-tartrate | +d | – | – |
| valerate | + | + | + |
| B-alanine | + | + | + |
| D-A-alanine | + | + | + |
| betaine | + | + | + |
| glycine | – | – | – |
| L-histidine | + | + | + |
| DL-norleucine | – | – | – |
| L-proline | + | + | + |
| D-tryptophan | – | – | + |
| L-valine | +d | – | + |
| DL-arginine | + | + | + |
| benzylamine | +d | – | – |
| butylamine | +* | – | + |
| putrescine | + | + | + |
| mesaconate | – | – | – |
| DL-glycerate | + | + | + |
| L-tryptophan | + | + | + |

| | ATCC Number |
|---|---|
| *Citrobacter freundii* | SD 1081 |

K = Alkaline reaction
d = 11–89% of strains are positive, BERGEY 1984; STANIER; SINSABAUGH.
* = STANIER and BALLARD: 95% of strains are positive.
** = Bergey 1984: 90–100% of strains are positive.

Morphology: Colonies are entire, smooth and glistening. Cells are gram negative motile rods.

| Physiology and Biochemistry | | |
|---|---|---|
| | 37° C. | 26° C. |
| Catalase | + | |
| Oxidase | – | |
| Motile | + | |
| *Flagella peritrichous* | + | |
| O-F glucose oxidative | + | + |
| O-F glucose fermentative | + | + |
| MacConkey agar growth | + | |
| Indole | – | – |
| Methyl red 37° C. | + | |
| Methyl red (RT) | + | |
| Voges Proskauer 37° C. | – | |
| Voges Proskauer (RT) | – | |
| Simmons citrate growth | + | + |
| Lysine decarboxylase | – | – |
| Arginine (Moellers) | + | + |
| Ornithine decarboxylase | + | + |
| Hydrogen sulfide (TSI) | – | – |
| Urease | + | + |
| Potassium cyanide growth | + | + |
| Phenylalanine deamination | – | – |
| Gluconate oxidation | – | – |
| Growth on malonate as SCS | + | + |
| Gelatinase | + | + |
| Nitrate to nitrite | + | + |
| Pectin hydrolysis | – | – |
| Mucate utilization | + | + |
| Growth on acetate as SCS | + | + |
| Citrate utilization | + | + |
| L-tartrate utilization | – | – |
| Aesculin hydrolysis | + | + |
| Tween 20 hydrolysis | + | |
| Tween 80 hydrolysis | – | |
| Acid from adonitol | – | – |

-continued

| Physiology and Biochemistry | | |
|---|---|---|
| | 37° C. | 26° C. |
| Gas from adonitol | – | – |
| Acid from L-arabinose | + | + |
| Acid from cellobiose | + | + |
| Gas from cellobiose | + | + |
| Acid from D-glucose | + | + |
| Gas from D-glucose | + | + |
| Acid from dulcitol | – | – |
| Acid from D-fructose | + | + |
| Acid from glycerol | + | + |
| Gas from glycerol | + | + |
| Acid from i-inositol | – | – |
| Gas from i-inositol | – | – |
| Acid from lactose | + | + |
| Acid from maltose | + | + |
| Acid from D-mannitol | + | + |
| Gas from D-mannitol | + | + |
| Acid from raffinose | – | – |
| Acid from L-rhamnose | + | + |
| Acid from salicin | + | + |
| Acid from D-sorbitol | + | + |
| Acid from sucrose | – | – |
| Acid from trehalose | + | + |
| Acid from D-xylose | + | + |
| Acid from melibiose | – | – |
| Acid from D-arabitol | – | – |
| ONPG produced | + | + |
| Pigment non-diffusible | – | |
| Pigment color: brown At least 0.5% NaCl reqd. | – | |
| violet Increased $CO_2$ required | – | |
| green Tyrosine clearing | – | |
| yellow Cephalothin | R | |
| red Ampicillin | S | |
| Carbenicillin | S | |

Comments: The following lists the many characteristics of isolate SC 1081 which do not meet the description of any one species. This isolate is an atypical *Citroacter freudii*. One totally aberrant characteristic of isolate SD 1081 is its ability to hydrolyse gelatin, a feature not usually associated with *Citrobacter sp*. The ATCC reports to have seen isolates of *C. amalonaticus* which have this feature as positive.

| Characteristics differentiating Citrobacter sp. | | | | |
|---|---|---|---|---|
| | C. freundii | C. diversus | C. amalonaticus | SD 1081 |
| Indole | – | + | + | – |
| H2S production | + | – | – | – |
| growth in KCN | + | – | + | + |
| Malonate | – | + | – | + |
| Aesculin | – | variable | + | + |
| Adonitol (acid) | – | + | – | – |
| D-arabitol | – | + | – | – |
| Tyrosine clearing | – | + | N.D. | – |
| Antibiogram | | | | |
| Cephalothin 30 | R | S | N.D. | R |
| Ampicillin 10 | S | R | N.D. | S |
| Carbenicillin | S | R | N.D. | S |

N.D. - no data

It is apparent that various modifications can be made as will be apparent to those skilled in this art, without departing from the spirit and scope of the invention.

Having described the invention what is claimed is:

1. In a process for the recovery of gold from a gold-bearing carbonaceous, carbon-containing particulate ore, a component of which is capable of adsorbing aurocyanide complexes from an aqueous cyanide leaching solution when the metal is extracted from the ore during hydrometallurgical treatment of the ore the improvement comprising pretreating said carbonaceous, carbon-containing ore to enhance recovery of the gold therefrom by contact therewith of a liquid medium which contains a heterotrophic microorganism, or admixture of heterotrophic microorganisms, at heterotrophic conditions sufficient to cultivate and grow said microorganism or microorganisms, and reduce the carbon content of the ore by consumption of the carbon, and hydrometallurgically treating the pretreated ore, the carbon component of which has been reduced by action of the heterotrophic microorganisms, to recover the gold therefrom.

2. The process of claim 1 wherein the ore treated by the medium containing the heterotrophic microorganisms, or microorganisms, at heterotrophic conditions to consume carbon is a pyritic ore, and the hydrometallurgical treatment employed is cyanidation.

3. The process of claim 2 wherein the treatment of the ore by the medium containing the heterotrophic microorganism, or microorganisms, at heterotrophic conditions, is conducted in a single stage.

4. The process of claim 1 wherein the ore, after treatment by the medium containing the heterotrophic microorganism, or microorganisms, at heterotrophic conditions, is treated by a medium containing an autotrophic microorganism, or microorganisms, at autotrophic conditions sufficient to oxidize and solubilize inorganic components of the ore.

5. The process of claim 1 wherein the ore is minus 100 mesh particle size, and the ore solids component of the slurry treated in the process ranges from about 5 percent to about 45 percent, based on the total weight of slurry.

6. The process of claim 5 wherein the ore solids component of the slurry treated in the process ranges from about 20 percent to about 30 percent.

7. The process of claim 1 wherein the treatment of the ore with the hterotrophic microorganism, or microorganisms, at heterotrophic conditions is conducted at pH ranging from about 7 to about 8.7, temperature ranging from about 21° C. to about 35° C. and the ore is treated over a period ranging from about 15 hours to about 42 hours.

8. The process of claim 7 wherein the pH ranges from about 7.5 to about 8.2, the temperature from about 28° C. to about 30° C., and the ore is treated over a period ranging from about 20 hours to about 30 hours.

9. The process of claim 1 wherein the heterotrophic microorganism is selected from the group consisting of:
*Aspergillus-brunneio-uniseriatus:* ATCC SC 1076,
*Penicillium-citrinum:* ATCC SD 1077,
*Alcaligenes denitrificans:* ATCC SD 1079,
*Pseudomonas cepacia:* ATCC SD 1080,
*Citrobacter freundii:* ATCC SD 1081, and
*Pseudomonas Cepacia:* ATCC SD 1082.

10. In a process for the recovery of fold from a particulate carbonaceous, carbon containing gold-bearing pyritic ore, a component of which is capable of absorbing aurocyanide complexes from an aqueous cyanide leaching solution when the gold is extracted from the ore during hydrometallurgical treatment of the ore, the improvement comprising the series of steps which include (i) admixing said carbonaceous, carbon-containing gold-bearing pyritic ore in a first step with a liquid medium which contains a heterotrophic microorganism, or microorganisms, and nutrients, to form a slurry, and continuing the treatment of said slurry at conditions sufficient to cultivate the heterotrophic microorganism, or microorganisms, and reduce the carbon content of the ore by consumption of the carbon, (ii) admixing, in a subsequent step, the heterotrophically pretreated ore, the carbon component of which has been reduced by action of the heterotrophic microorganisms, with a liquid medium which contains an autotrophic microorganism, or microorganisms, and nutrients, at conditions sufficient to oxidize the iron and sulfur components of the ore, and then hydrometallurgically treating the pretreated ore of step (i) and (ii) to recover the gold.

11. The process of claim 10, wherein the subsequent hydrometallurigical treatment comprises cyanidation of the ore to extract the gold.

12. The process of claim 10 wherein the ore is minus 100 mesh particle size, and the ore solids component of the slurry treated in the process ranges from about 5 percent to about 45 percent, based on the total weight of slurry.

13. The process of claim 12 wherein the ore solids component of the slurry treated in the process ranges from about 20 percent to about 30 percent.

14. The process of claim 10 wherein the treatment of the ore with the heterotrophic microorganism, or microorganisms, at heterotrophic conditions is conducted at pH ranging from about 7.0 to about 8.7, temperature ranging from about 21° C. to about 35° C. and the ore is treated over a period ranging from about 15 hours to about 42 hours.

15. The process of claim 14 wherein the pH ranges from about 7.5 to about 8.2, the temperature ranges from about 28° C. to abut 30° C., and the ore is treated over a period ranging from about 20 hours to about 30 hours.

16. The process of claim 10 wherein the treatment of the ore with the autotrophic microorganism, or microorganisms, at autotrophic conditions, is conducted at pH ranging from about 2.2 to about 3.2, temperature ranging from about 21° C. to about 35° C., and the ore is treated over a period ranging from about 72 hours to about 144 hours.

17. The process of claim 16 wherein the pH ranges from about 2.5 to about 2.7, the temperature ranges from about 30° C. to about 31° C., and the ore is treated over a period ranging from about 120 hours to about 130 hours.

18. The process of claim 10 wherein the heterotrophic microorganism, or microorganisms, employed in conducting step (i) is selected from the group consisting of
*Aspergillus-brunneio-uniseriatus* ATCC SD 1976,
*Penicillium-citrinum* ATCC SD 1077,
*Alcaligenes Denitrificans* ATCC SC 1079,
*Pseudomonas cepacia* ATCC SD 1080,
*Citrobacter freundii* ATCC SD 1081, and
*Pseudomonas cepacia* ATCC SD 1082.

19. The process of claim 10 wherein the autotrophic microorganism, or microorganisms, employed in conducting step (ii) is selected from the group consisting of
*Thiobacillis ferrooxidans,*
*Thiobacillis thiooxidans,*
*Thiobacillis strain TB/*101-*E/LSU,*
*Thiobacillis F TB* 101-*F/LSU* ATCC SC 1083,

*Thiobacillis E* 301-*E/LSU,* and
*Thiobacillis F TB* 302-*E/LSU* ATCC SD 1084.

20. The process of claim 10 wherein the hterotrophic microorganism, or microorganisms, employed in conducting step (i) is selected from the group consisting of
*Aspergillus-brunneio-uniseriatus* ATCC SD 1076,
*Penicillium-citrinum* ATCC SC 1077,
Alcaligenes denitrificans ATCC SC 1079,
*Pseudomonas cepacia* ATCC SD 1080,
*Citrobacter freundii* ATCC SD 1081, and
*Pseudomonas cepacia* ATCC SD 1982
and the autotrophic microorganisms, or microorganisms, employed in conducting step (ii) is selected from the group consisting of
*Thiobacillis ferrooxidans,*
*Thiobacillis thiooxidans,*
*Thiobacillis strain TB*/101-*E/LSU,*
*Thiobacillis F TB* 101- *F/LSU* ATCC SD 1083,
*Thiobacillis E* 301-*E/LSU,* and
*Thiobacillis F TB* 302-E/LSU ATCC SD 1984.

* * * * *